Oct. 7, 1952 W. H. ALDEN, JR 2,612,981
MATERIAL-CONTROLLED ARTICLE TRANSFER MECHANISM
Original Filed Dec. 4, 1948 8 Sheets-Sheet 1

INVENTOR.
WILLIAM HYDE ALDEN, JR.
BY Alvin Engelstein
ATTORNEY.

Oct. 7, 1952 W. H. ALDEN, JR 2,612,981
MATERIAL-CONTROLLED ARTICLE TRANSFER MECHANISM
Original Filed Dec. 4, 1948 8 Sheets-Sheet 7

INVENTOR.
WILLIAM HYDE ALDEN, JR.
BY Alvin Engelstein
ATTORNEY.

Oct. 7, 1952 W. H. ALDEN, JR 2,612,981
MATERIAL-CONTROLLED ARTICLE TRANSFER MECHANISM
Original Filed Dec. 4, 1948 8 Sheets-Sheet 8

INVENTOR.
WILLIAM HYDE ALDEN, JR.
BY Alvin Engelstein
ATTORNEY.

Patented Oct. 7, 1952

2,612,981

UNITED STATES PATENT OFFICE 2,612,981

MATERIAL-CONTROLLED ARTICLE TRANSFER MECHANISM

William Hyde Alden, Jr., Bryn Athyn, Pa., assignor to Allied Chemical & Dye Corporation, New York, N. Y., a corporation of New York Original application December 4, 1948, Serial No. 63,513. Divided and this application January 25, 1950, Serial No. 140,502

6 Claims. (Cl. 198—21)

This invention relates to an apparatus and process for handling sheet or slab material and, more particularly, refers to a new and improved method and apparatus for collecting asphalt shingles into bundles as they are delivered from the cutter and collating them with wrapping material ready for tying. This application is a division of my copending application, Serial No. 63,513, filed December 4, 1948.

In the industry, shingles are most commonly sold in a group of bundles, the aggregate number of shingles in each group being sufficient to cover a given area usually 100 square feet of surface. A typical number of shingles required for this coverage is 80 shingles which, due to difficulties in packaging and handling, are ordinarily divided into three bundles containing for example 26, 27, and 27 shingles each.

A number of devices have been suggested for collecting, stacking and wrapping shingles into bundles but all have at least one defect such as requiring a relatively large amount of manual labor, frequent occurrence of error in number of shingles in a bundle, and slow operation.

As an example of a conventional method of bundling shingles, the shingles from a cutter are delivered to chutes, one for each lane of shingles, and thence to a belt conveyor which is sloped upward. If a four lane sheet is being run, there would be two belt conveyors each receiving shingles from two chutes. When a two lane sheet is run one belt conveyor only is used. The belt conveyors are operated at a speed to impart sufficient momentum to deliver the shingles horizontally to suitable catch boxes which are open at the side for the removal of shingles. When about half a bundle has accumulated in one of the catch boxes, an operator removes them manually and places them on a wrapper previously placed by him on a roller conveyor. A bell on the cutter is rung by a counting device when the required number of shingles to compose a bundle has been delivered to the catch box and the operator then removes the balance of the bundle and places it on the part of the bundle previously placed on the roller conveyor. As the number of shingles of this type required per bundle is 27 for two bundles and 26 for the third, it is necessary for the operator to add a shingle from a spare pile to two bundles out of every three. For three or four lane operation, two catch box operators are required, both making up bundles on the same roller conveyor. When the required number of shingles have been placed on the wrappers they are pushed by hand along the roller conveyor one at a time to a jog box. At this stage the shingles are not stacked evenly with each other. The jog box is pivoted so that the jog box operator can tip the bundle on edge and by shaking the box when the shingles are on edge and manipulating the shingles with his right hand he evens up the bundle, after which, with an upward and forward motion of the jog box handle he restores the bundle to horizontal position and discharges it from the jog box onto a power driven tying conveyor which is located in front of the jog box and at a right angle to the roller conveyor.

A primary object of the present invention is to provide an efficient economical method and equipment for continuously receiving shingles from the cutting machine and automatically stacking the shingles in bundles and groups of bundles of the desired number ready for tying.

Another object of the invention is to provide an improved cross-collecting table for receiving shingles from the cutter, partially stacking and transferring the shingles to the succeeding device.

A further object is to provide an improved means of averaging out the total number of shingles in a group of bundles when that number is not an even multiple of the number of lanes of shingles from the cutter by automatically providing each bundle with a number of shingles which are an even multiple of the number of lanes with the correct average number of shingles per bundle and with the variation in shingles between bundles not greater than the number of lanes.

A further object is to provide an improved method and apparatus for depositing stacks of shingles placed on a wrap-around wrapper on a tying conveyor.

Other objects and advantages of the present invention will be apparent from the following description and accompanying drawings.

Referring to the drawings.

Figures 1, 2:
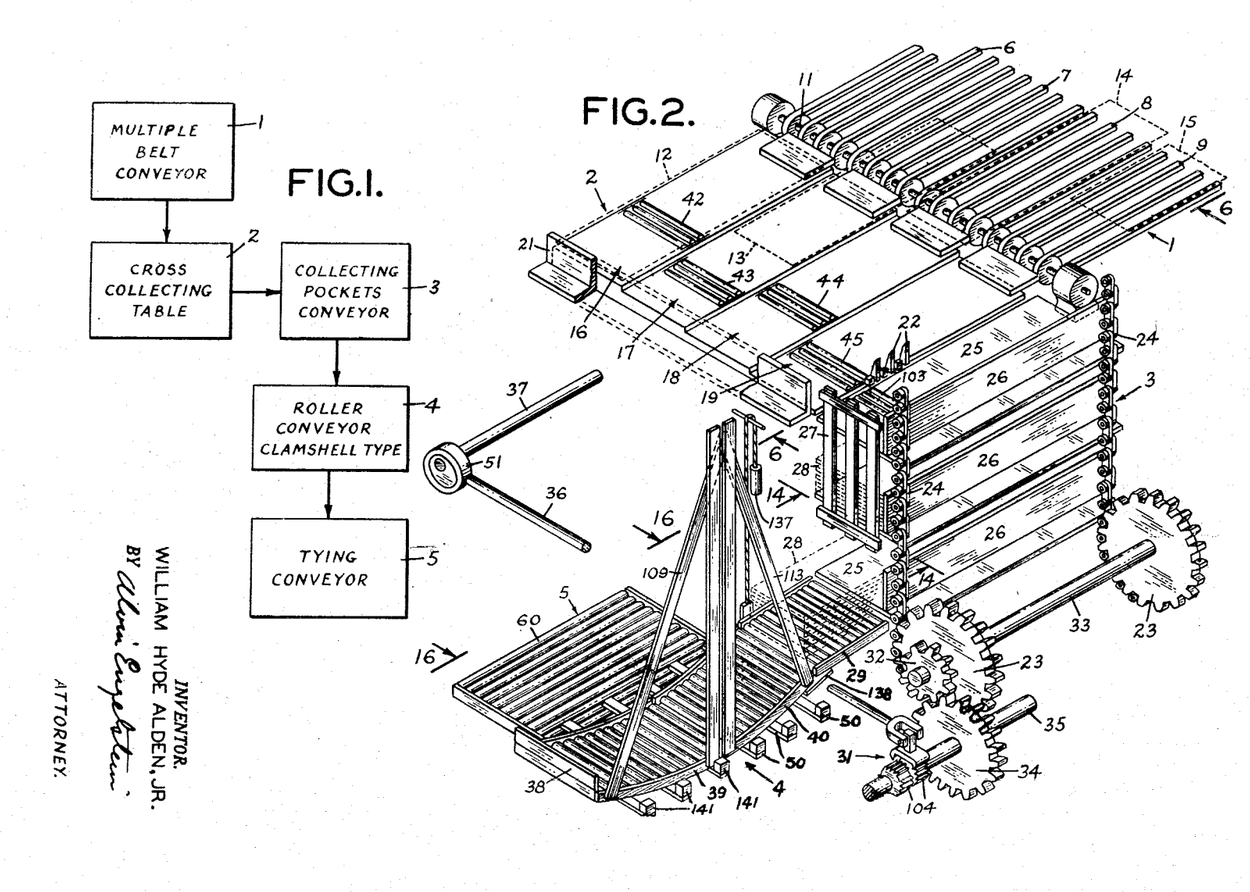
Fig. 1 diagrammatically represents the major items of equipment and the passage of shingles through my apparatus.
Fig. 2 is a partial isometric view illustrating the unitary operation of the assembled apparatus.

Shingles are ordinarily cut in various shapes from lengths of asphaltic material and the shingles from the cutting machine discharged usually at different levels onto a belt conveyor. In Fig. 1 shingles from the cutting machine received by a multiple belt conveyor 1, are elevated to the level of and discharged onto cross-collecting table 2. Multiple belt conveyor 1 may be of any conventional type and will normally have two tail shafts at different levels with a single head shaft driven from one of the cutter shafts with the proper ratio for timing so that the shingles will be delivered to the cross-collecting table 2 at the same speed as they are delivered from the cutter belts.

Cross-collecting table 2 has a top surface or platform composed of rollers arranged in lanes at successively lower levels. Interchangeable table tops with various numbers of lanes and lane widths may be provided for each condition of shingle production. The top of cross-collecting table 2 is inclined at an angle in the direction of the oncoming shingles, approximately 30° from the horizontal, permitting shingles entering the lanes of the cross-collecting table to roll by gravity to the end of the table where they come to rest against a stop. The discharge of shingles from the cutter and the speed of multiple belt conveyor 1 are related to effect successive delivery of shingles, in staggered relationship, preferably with about a 3 to 8 inch lag between shingles in successive lanes, onto the lanes of cross-collecting table 2. Thus, when a shingle in the lane of highest elevation reaches the end of cross-collecting table 2, pushers disposed between rollers and operating at a right angle to the direction of delivery of the shingles advance to push the shingles from a region of higher elevation or lane of highest level on which the first shingle rests, to succeeding lanes of lower level on which the remaining shingles on the cross-collecting table lie thereby superimposing and stacking the shingles. The speed of the pushers across the cross-collecting table is correlated with the entrance of the staggered shingles onto the succeeding lanes in such manner that the lateral movement of the pushers commence when the shingle in the lane of highest elevation is at the end of travel against the stop and the forward motion of the pushers is timed to arrive at each succeeding lane of lower elevation just subsequent to the shingle on that lane reaching the stop at the end of the table. Pushers continue their advance to discharge the stack of shingles from the lane of lowest level onto the succeeding device, collecting pockets conveyor 3. The number of pushers and their disposition in the spaces between rollers of the cross-collecting table will depend on the size and shape of the shingle. The main crank shaft of the pusher mechanism is positively driven from the cutter and synchronized with the discharge from the cutter to correlate discharge of shingles from the cutter with the discharge of shingles from the cross-collecting table.

Collecting pockets conveyor 3 is a vertical conveyor comprising a continuous chain passing over sprockets above and below the position for receiving shingles from cross-collecting table 2. Mounted on the endless chain are a series of equally spaced collecting pockets each of which consists of a base composed of rollers arranged for motion parallel to the line of delivery of shingles with a back plate perpendicular to the length of the rollers. Collecting pockets are intermittently lowered a short distance after each small group of shingles are discharged by the pushers from cross-collecting table 2 onto a collecting pocket in a receiving position. When the number of shingles to complete a bundle has been delivered to a collecting pocket provision is made for a sufficiently large drop of the pocket conveyor to bring the next pocket into receiving position. The collecting pockets may be adjusted to take different widths of shingles. The necessary number of shingles per bundle is insured by means of an escape mechanism consisting of a ratchet and pawl, operating in the usual way, passing one tooth of the ratchet for each reciprocatory motion of the pawl; however when one end of the pawl comes in contact with a portion of the ratchet which has teeth missing a correspondingly greater rotation takes place consequently permitting the collecting pocket with the desired number of shingles to drop down out of receiving position and a succeeding empty collecting pocket to move into position for receiving shingles. The receiving pocket mechanism is activated by gravity, at least one full pocket being in position at all times to provide the necessary unbalanced weight. The pawl of the escape mechanism is related to the movement of the pusher mechanism in the cross-collecting table 2. Interchangeable ratchets may be provided for each type of shingle and number of shingles required per bundle. The teeth in each ratchet are spaced to provide for the correct average number of shingles in the bundles resulting from one complete revolution of the ratchet.

Collecting pockets conveyor 3 is tilted in such manner that the bases of the collecting pockets on the receiving side are inclined downwardly in a direction at a right angle to the direction of the shingles moving into the collecting pockets. To prevent shingles from sliding off the side of the inclined collecting pockets, an upright crossbar shoulder stationed adjacent the side of collecting pockets restrains the bundle of shingles thereon. This shoulder extends down to a point just above the top of the bundle in the discharge position of the collecting pocket. When a collecting pocket containing the desired number of shingles to form a bundle drops to discharge position, the bundle of shingles thereon, no longer restrained by the cross-bar shoulder, rolls by gravity onto a pivoted platform consisting of a series of parallel rollers and forming part of roller conveyor clamshell type 4 referred to also as clamshell conveyor or bundle catcher.

The clamshell conveyor has as its base, a suspended substantially horizontal curved roller platform disposed adjacent the discharge end of the stationary platform for receiving bundles of shingles from collecting pockets conveyor 3. Each bundle of shingles discharged from the collecting pocket rolls by gravity onto the platform of the clamshell until it comes to rest by means of a stop at the far end of the platform. Contact of the bundle with a switch mounted on the stop starts an electric motor which causes the platform, divided into sections at its center, to swing apart thereby permitting the bundle of shingles to drop onto an actuated tying conveyor 5 disposed directly beneath the platform of the clamshell. As the bundle moves on the tying conveyor 5 out of the path of the clamshell it strikes a release which causes the sections of the platform of the clamshell to return by gravity to their normal closed position or a switch may be substituted for the release, the former actuating power means for positively closing the clamshell. Backing board for each bundle of shingles may if desired be placed on the receiving pockets or on the tying conveyor or a wrap-around wrapper may be placed on the tying conveyor in position to receive the bundles as deposited by the clamshell conveyor.

Fig. 2 illustrates an isometric view of my shingle collecting and counting device stripped of the non-essential details of the structural supporting framework. Multiple belt conveyor 1 carrying 4 lanes of shingles on belts 6, 7, 8 and 9 (number of lanes may be more or less) terminates in common head shaft 11 disposed adjacent receiving end of cross-collecting table 2. The staggered position of shingles 12, 13, 14 and 15 carried by multiple belt conveyor 1 onto cross-collecting table 2 are indicated by dotted lines. As the shingles 12, 13, 14 and 15 roll down inclined cross-collecting table 2 onto respective lanes 16, 17, 18 and 19 maintained at decreasing levels they are stopped when they reach the end of the table by angle iron 21. Pushers 22 shown in their most forward position have just completed dsicharging a stack of four shingles onto collecting pocket of collecting pockets conveyor 3. Pushers 22 are then retracted to the rear of the table and then repeat the operation of advancing forward to stack and push another group of four shingles onto the receiving pocket. For greater time efficiency the forward motion of the pushers may commence when shingle 12 has reached the end of cross-collecting table 2 since by the time pushers 22 have advanced across lane 16, shingle 13 will have reached the end of cross-collecting table 2 and successively shingles 14 and 15 will reach their respective stops ahead of the cross pushers 22.

For clarity, a portion of collecting pockets conveyor 3 has been omitted from Fig. 2. Sprockets 23 are meshed with endless chains 24 on which latter are mounted receiving pockets consisting of roller bases 25 and forwardly adjustable back plates 26. The shingles on collecting pockets 25 are prevented from rolling off by restraining shoulder 27 until the bundle of shingles shown in dotted lines and designated by numeral 28 drops to discharge position at which point shingles 28 pass below the restraining shoulder 27 and move by gravity down inclined pivoted platform 29 of clamshell conveyor 4. The intermittent motion of collecting pockets conveyor 3 is regulated by escape mechanism 31 connected to sprocket 23 by means of gear 32 mounted on shaft 33 meshing with gear 34 mounted on shaft 35. Connecting rod 36 terminating in eccentric 51 mounted on shaft 37 coordinates the movement of the escape mechanism 31 with the motion of pushers 22 on cross-collecting table 2. As the bundle of shingles 28 moves along pivoted roller platform 29 onto clamshell conveyor 4 it advances to the end of clamshell 4 where it is stopped by stop plate 38 centering it on the platform of clamshell 4. The platform of clamshell 4 may be said to consist of three sections, pivoted platform 29 and sections 39, and 40. Mounted on stop 38, not shown in the drawing, is a switch which when pressed by bundle of shingles 28 actuates a motor which causes sections 39 and 40 to divide and section 29 which is pivotably mounted at and adjacent to pocket conveyor 3 to raise out of the way of section 40 thereby permitting the bundle of shingles 28 to drop down onto tying conveyor 5 shown in Figs. 16 and 17. Counterweight 137 or suitable power driven means may be employed for elevating section 29.

Figures 3, 4:
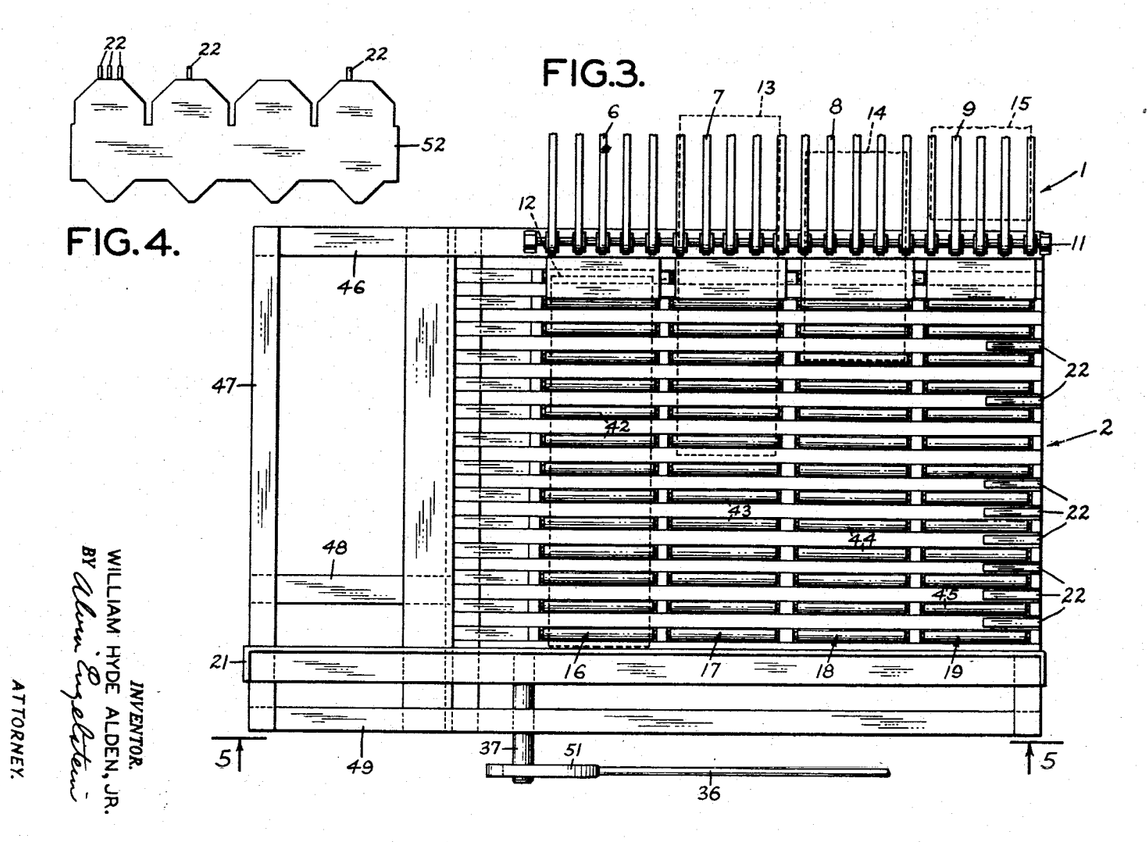
Fig. 3 is a plan view of the cross-collecting table together with part of the multiple belt conveyor.
Fig. 4 illustrates a typical shingle with pushers disposed behind it to propel it forward.

One purpose of clamshell conveyor 4 is to permit the use of wrap-around wrappers in connection with automatic shingle collecting equipment which hitherto to the best of my knowledge has not been possible of accomplishment. The wrap-around wrapper is more economical and protects the shingles better than other forms of wrapping such as backing board and cover. The wrap-around wrapper may be placed on counterweighted bars 50 disposed directly beneath clamshell 4 either by hand or automatically at the proper time to receive shingles from clamshell conveyor 4. Normally, the counterweights on bars 50 causes them to remain elevated until a bundle of shingles 28 dropping through aperture between divided sections 39 and 40 lowers bars 50 until the bundle of shingles are engaged by wheels (Figs. 16 and 17) which carry it away onto conveyor 60.

Fig. 3 is a plan view of cross-collecting table 2 together with the discharge portion of multiple belt conveyor 1. Shingles 12, 13, 14 and 15 in respective lanes 16, 17, 18 and 19 advance onto cross-collecting table 2 in staggered relationship on respective belt conveyor lanes 6, 7, 8 and 9 terminating in common head shaft 11. Lanes 16, 17, 18 and 19 at succeeding lower levels are composed of a series of rollers 42, 43, 44 and 45. The spaces between the rollers provide passageways for pushers 22 moving at right angles to the direction of the entering shingles. Stop plate 21 halts the advance of the shingles when they arrive at the end of the sloped cross-collecting table maintaining them in alignment and preventing them from sliding off the table. Members 46, 47, 48 and 49 are the usual structural supporting members. Connecting rod 36 together with eccentric 51 mounted on shaft 37 transmits reciprocating motion to escape mechanism 31, shown on Fig. 13, in synchronism and properly timed with the movement of pushers 22.

Fig. 4 illustrates the shape of a typical shingle 52 and one method of arranging pushers 22 behind the shingle to advance it across cross-collecting table 2.

Figure 5:
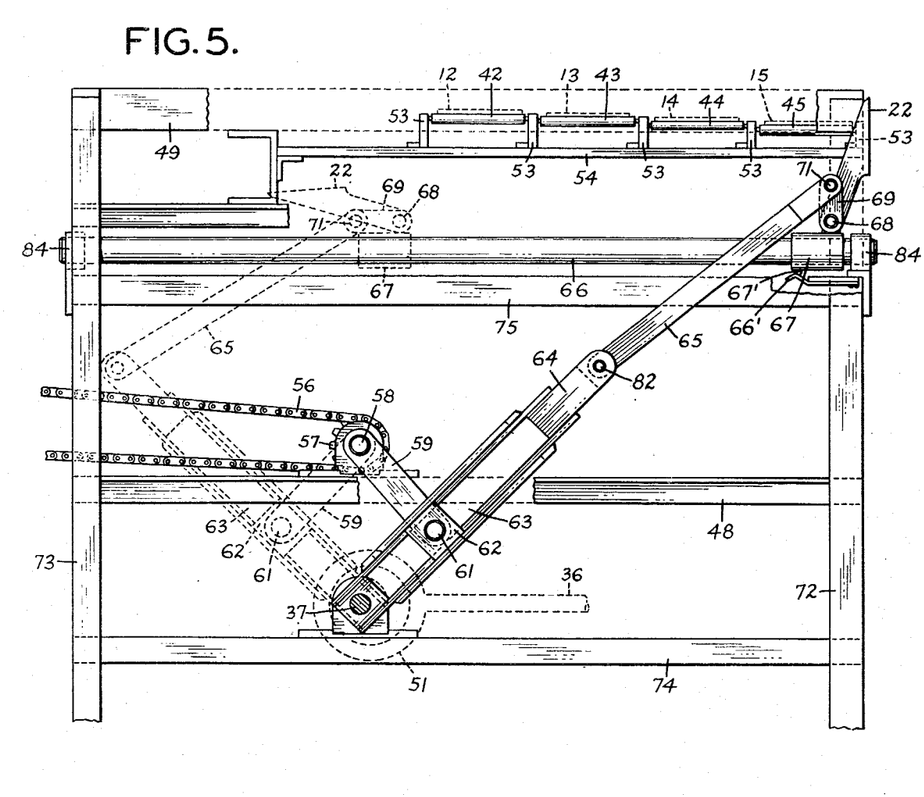
Fig. 5 is a front elevation of the cross-collecting table taken on line 5—5 of Fig. 3.

In Fig. 5 are shown the four lanes of rollers 42, 43, 44 and 45 at decreasing elevations on which are disposed shingles 12, 13, 14 and 15. The ends of the rollers are mounted in supports 53 supported by member 54. Pusher 22 is shown in a forward position in solid lines and in retracted position in dotted lines. Drive chain 56 positively driven from and properly timed with the cutter mechanism engages sprocket 57 thereby effecting rotation of shaft 58. The rotary movement of shaft 58 is converted into reciprocating motion by means of crank 59 mounted on shaft 58 which is pivotally attached to sliding member 62 by means of pin 61 causing member 62 to slide back and forth in channel 63 of main crank 64. The lower end of main shaft 64 is mounted on shaft 37 onto which latter eccentric 51 is also mounted thereby providing reciprocating motion to rod 36 connected to the pawl of escape mechanism 31. Extension arm 65 is pivotally attached to the upper end of the main crank 64 by pin 82. Wrist pin 71 connects arm 65 to link arm 69 mounted on shaft 68 which in turn is supported by sleeve 67 sliding back and forth on horizontal guide rod 66. Pushers 22 are rigidly mounted on shaft 68. Retarding spring 66' pressing against bar 67' rigidly attached to sleeve 67 delays the return of sleeve 67 to afford pushers 22 an opportunity to be first lowered before retraction. Typical structural framework members 48, 49, 72, 73, 74 and 75 are provided for supporting cross-collecting table and its related mechanism.

Figure 6:
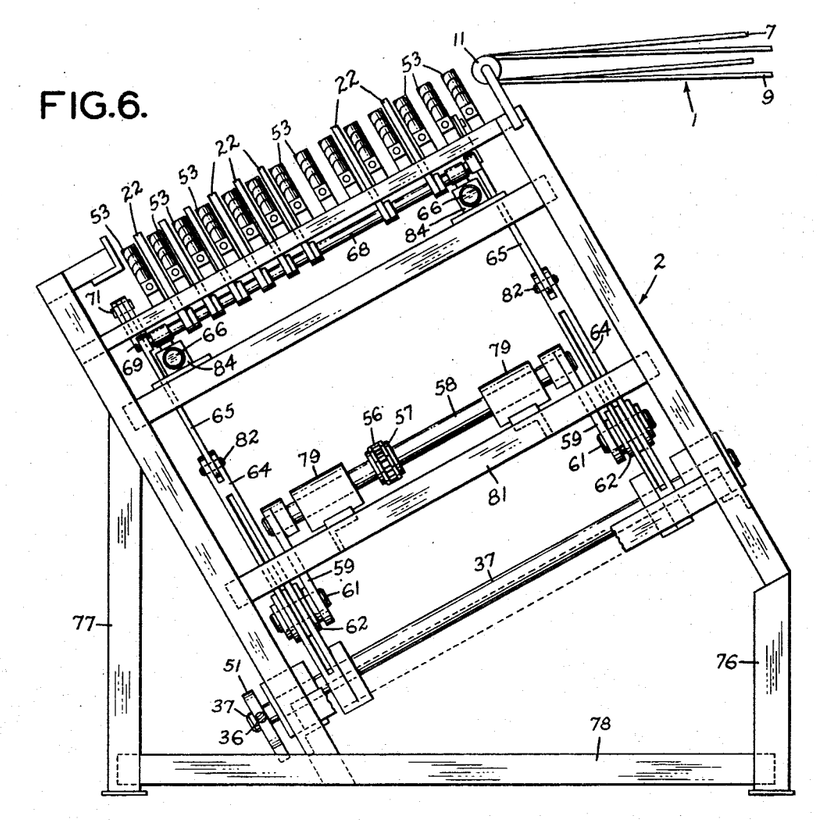
Fig. 6 is an end view of the cross-collecting table taken on line 6—6 of Fig. 2.

Fig. 6 presents another view of cross-collecting table 2 and discharge end of multiple belt conveyor 1 showing its common head shaft 11 and conveyor belts 7 and 9. On the top of cross-collecting table are members 53 which support rollers forming the four lanes onto which the shingles from multiple belt conveyor 1 discharge. Between the rollers at the top of the table are pushers 22. At approximately the center of Fig. 6 may be seen shaft 58 journalled in bearings 79 which latter are supported by frame member 81. Chain 56 driven from the cutter turns sprocket 57 affixed to shaft 58. Arm 59 is attached at one end to shaft 58 and at the other end to pin 61 on which latter is mounted sliding member 62 which slides in channel 63 of main crank 64 thereby converting the rotary motion of shaft 58 into an oscillating motion of crank 64. Main crank 64 is pivotally connected to connecting rod 65 by means of pin 82. Connecting rod 65 in turn is pivotally attached to arm 69 by means of wrist pin 71 and arm 69 in turn is rigidly mounted on shaft 68 which in turn is affixed to sleeve 67 (Fig. 7), which latter slides back and forth on rod 66. Pushers 22 are also affixed to shaft 68. In this manner rotary motion of shaft 58 is converted into reciprocatory motion for moving pushers 22 back and forth in the spaces between rollers 42, 43, 44 and 45 composing the top of cross-collecting table 2 and retraction of the pushers 22 out of the path of the shingles on the return stroke is accomplished. Although an electric motor may be employed as a means of driving chain 56 on sprocket 57 the motivating power for driving the pushers is desirably geared directly to the cutters. In any event the speed of the pushers should be synchronized with the discharge rate of shingles from multiple belt conveyor 1 onto cross-collecting table 2. The lower end of main crank 64 is mounted on shaft 37 causing the latter to revolve alternatively clockwise and counterclockwise in an incomplete circle. Shaft 37 imparts reciprocating motion to rod 36 by means of eccentric 51 to which it is attached at one end and connected at its other end to the pawl of escape mechanism 31.

Although the platform of cross-collecting table 2 is shown as composed of lanes of rollers in Fig. 5, it will be evident that flat surfaces or any suitable support may be employed for supporting the shingles in lanes of descending level.

Figures 7, 8, 9:
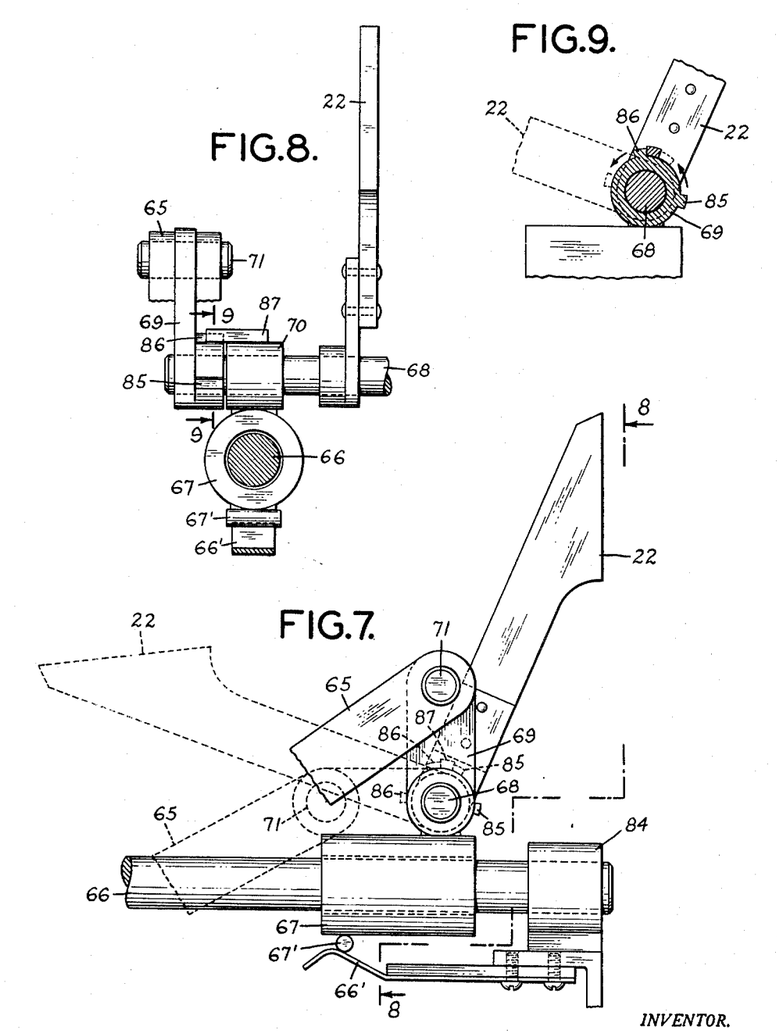
Fig. 7 shows part of the pusher mechanism of the cross-collecting table on a large scale.
Fig. 8 is an end view of the pusher mechanism taken on line 8—8 of Fig. 7.
Fig. 9 is, on a larger scale and in partial section, a part of the pusher mechanism shown on Fig. 7.

Fig. 7 illustrates in greater detail pushers 22 and means for maintaining them in upright position when advancing across the table and in lowered position so as not to strike the oncoming shingles when being retracted. On guide rod 66 mounted at its ends in supports 84 is sleeve 67 which slides back and forth on rod 66. Shaft 68 on which pushers 22 are rigidly mounted is carried back and forth with sleeve 67 by extension 70 affixed to sleeve 67. Also rigidly mounted on shaft 68 is link arm 69 which in turn is connected to arm 65 by means of wrist pin 71. Affixed to link arm 69 are bars or lugs 85 and 86 and affixed to extension 70 of sleeve 67 is bar 87. When extension arm 65 is propelled in a forward direction, arm 69 assumes a vertical position retaining that position by bar 86 stopping against lug 87. The upward movement of arm 69 causes shaft 68 to rotate slightly carrying with it pusher 22 which then also assumes an upright position. When connecting rod 65 moves rearwardly it pulls arm 69 down to a relatively horizontal position where it is maintained by bar 85 stopping against bar 87. The downward movement of arm 69 rotates shaft 68 counterclockwise thereby causing pusher 22 to assume a lowered position out of the way of the oncoming shingles entering cross-collecting table 2.

To make certain that pushers 22 are in lowered position before being retracted, a restraining spring 66' pressing against bar 67' attached to sleeve 67 is provided thereby delaying the return of sleeve 67 until arm 65 causes pushers 22 to be lowered. A similar spring arrangement may be provided at the opposite end of rod 66 thus assuring pushers 22 being in an upright position prior to its advance against the shingles.

Fig. 8 represents another view of Fig. 7 showing shaft 66 on which is mounted sleeve 67 and extension 70. Pusher 22 and link arm 69 to which is affixed bars 85 and 86 are rigidly attached to shaft 68. Bar 87 remains in fixed position on extension 70 of sleeve 67.

Fig. 9 illustrates in further detail the arrangement for maintaining pusher 22 in upright and lowered position. Bars 85 and 86 attached to member 69 rotate in the direction of the movement of the pushers. Bar 87 remains in fixed position. Since link arms 69 and pushers 22 are both rigidly mounted on shaft 68, rotation of shaft 68 caused by the forwardly and rearwardly movement of arm 69 would likewise cause pusher 22 to assume an upright or lowered position. Thus bars 85, 86 and 87 act as stop means for maintaining the pushers in a relatively horizontal or vertical position.

Figure 10:
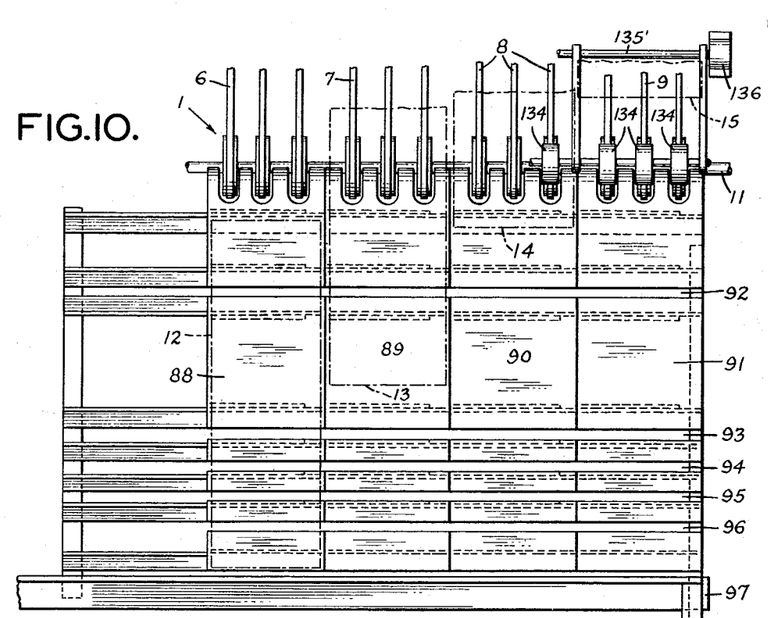
Fig. 10 is a plan view of an alternative form of cross-collecting table.
Figure 11:
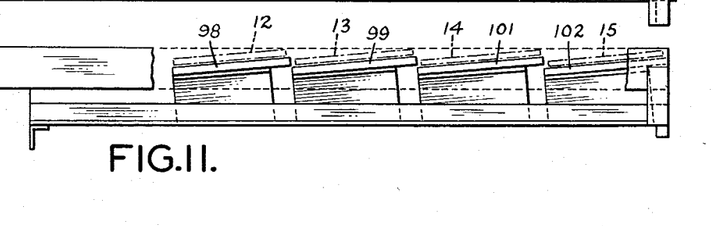
Fig. 11 is a front elevation of the cross-collecting table shown in Fig. 10.

In Fig. 10 is illustrated a plan view of an alternative form of cross-collecting table showing head shaft 11 at the discharge side of a multiple belt conveyor 1 and belts 6, 7, 8 and 9 carrying shingles 12, 13, 14 and 15 onto the cross-collecting table. Weighted idler wheels 134 attached to arm 135, which latter is pivotally mounted on shaft 135' which in turn is mounted on support 136, press against the top of the shingles being transferred from the multiple belt conveyor to the cross-collecting table thereby facilitating the passage of the shingles in a direct line onto the lanes of the cross-collecting tables. The cross-collecting table is divided in four lanes designated by numerals 88, 89, 90 and 91. Pushers, not illustrated in this figure, operate in a manner previously described in connection with the cross-collecting table in Figs. 3, 5, 6 and 7 by passing through passages 92, 93, 94, 95 and 96 in a direction at right angles to the direction of the entering shingles. The entire cross-collecting table is tilted to permit shingles 12, 13, 14 and 15 to slide by gravity to the end of the table until stopped by angle iron 97. Each of the lanes 88, 89, 90 and 91 are provided with platforms inclined at an angle from the horizontal in such manner that the forward or leading side of one shingle is disposed at a level above the hind side of the adjacent shingle in the next lane (Fig. 11). Thus, as the pushers advance across the cross-collecting table through passageways 92, 93, 94 and 95, the shingles are superimposed one upon the other prior to their discharge onto collecting pockets conveyor 3. The arrangement of the lanes and the position of the shingles thereon may be better seen in Fig. 11 which is a side elevation of Fig. 10. Shingles 12, 13, 14 and 15 rest on respective inclined platforms 98, 99, 101 and 102. All the platforms in this type of arrangement may if desired be on a common level. The shingle supports making up the platforms may be a flat surface and need not be constructed of a series of rollers.

Figure 12:
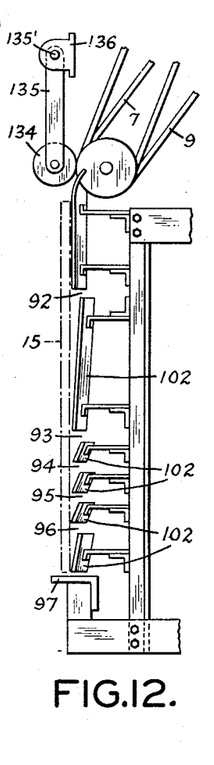
Fig. 12 is an end view of the cross-collecting table shown in Fig. 10.

Fig. 12 is a side elevation of the alternative form of cross-collecting table together with discharge end of multiple belt conveyor consisting of head shaft 11 and belts 9 and 7. Shingle 15 is shown supported by inclined platform 102 divided into sections to permit pushers to pass through spaces 92, 93, 94, 95 and 96 through which pushers move to discharge the shingles from the cross-collecting table onto collecting pockets conveyor 3. Sections of platform 102 between pusher slots are tilted so as to prevent the forward edges of shingles from catching in the pushers slots 92, 93, 94, 95 and 96.

Figures 13, 15:
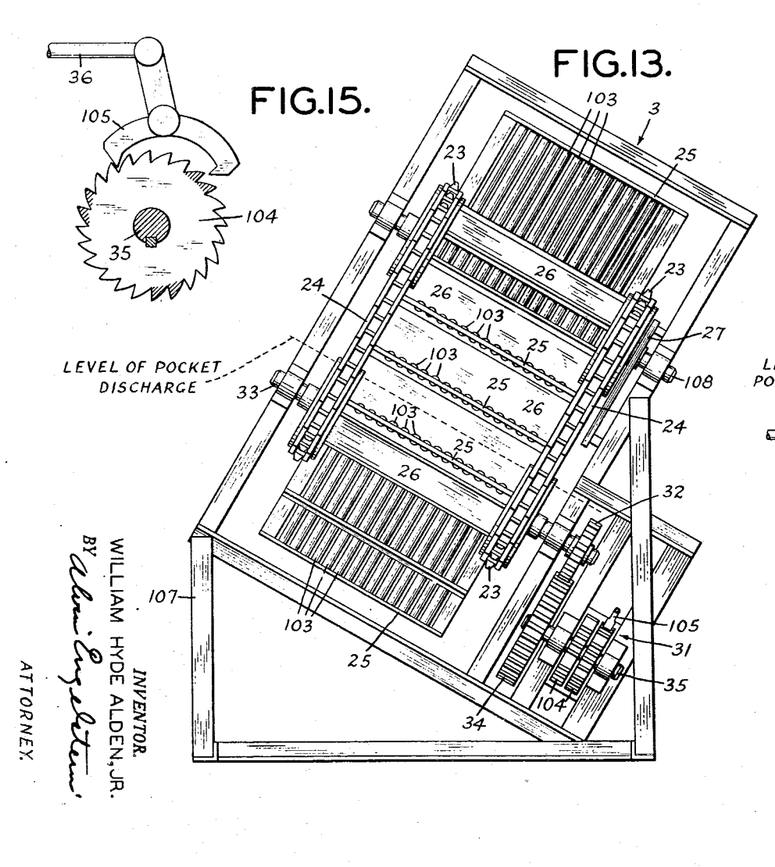
Fig. 13 is a side elevation of the collecting pockets conveyor when viewed from the discharge side of the cross-collecting table.
Fig. 15 shows the escape mechanism of the collecting pockets conveyor on a larger scale.

Collecting pockets conveyor 3 shown in Fig. 13 comprises a pair of continuous chains 24 revolving around spaced sprockets 23 and attached to chains 24 are a series of collecting pockets on which the shingles from cross-collecting table 2 discharge when a pocket is in receiving position. The base 25 of each collecting pocket consists of a series of twenty-four rollers 103 on which the shingles rest; a perpendicular back plate 26 retains the bundle of shingles discharged thereon by pushers 22 of cross-collecting table 2. As each group of shingles deposits on the collecting pocket in receiving position, it moves intermittently downwardly a sufficient distance to receive the next group of four shingles from cross-collecting table 2. When the desired number (24 or 28) of shingles to form a single bundle has been deposited on the receiving pocket it drops out of the path of the discharge end of cross-collecting table 2 and a following collecting pocket moves into position adjacent the discharge end for delivery of another small stack of shingles. An escape mechanism 31 operating in synchronism and properly timed with pushers 22 permits movement of the collecting pockets induced by the weight of the shingles in the pockets so that the desired number of shingles are placed in each pocket before an empty pocket is brought into position to receive shingles. The escape mechanism 31 comprises two ratchets 104 mounted on shaft 35 with offset pawl 105 operating between the ratchets. Ratchets 104 are keyed in place on shaft 35. Ratchet shaft 35 is connected to lower sprocket shaft 33 by means of gears 32 and 34 of suitable ratio. Suitable structural framework designated by numeral 107 is employed to support collecting pockets conveyor 3.

Figure 14:
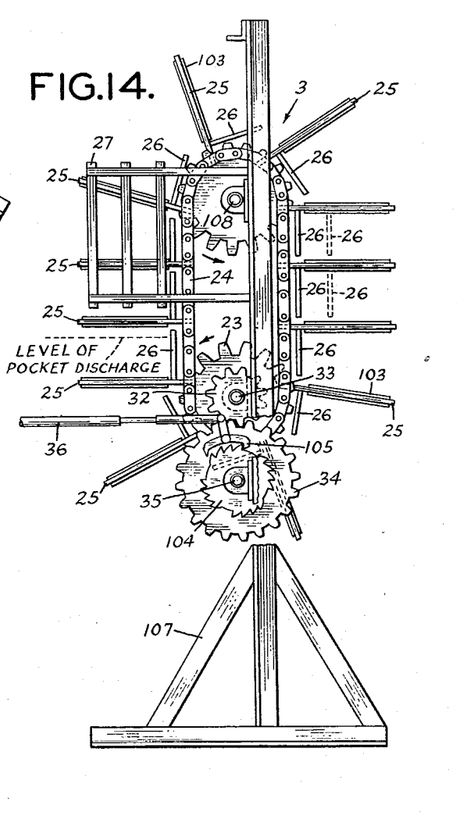
Fig. 14 is a front elevation of the collecting pockets conveyor taken on line 14—14 of Fig. 2.

In Fig. 14 is illustrated another view of collecting pockets conveyor 3 showing endless chain 24 passing over upper sprockets 23 mounted on shaft 108 and lower sprockets 23 mounted on shaft 33. Attached to endless chain 24 are a series of receiving pockets consisting of base 25 and back plate 26 perpendicular to the base.

To accommodate different sizes of shingles, an adjustable back plate 26 may be provided for different depths of collecting pockets as shown in dotted lines in Fig. 14, or a double back plate 26 may be provided with the rear plate remaining in fixed position and the forward plate capable of being moved to the desired depth of pocket. Shingles discharged onto receiving pocket 25 when in receiving position are prevented from rolling off the pocket by cross-bar shoulder 27. As pocket 25 moves downwardly to the discharge position the shingles thereon are no longer restrained by shoulder 27 and roll onto stationary platform 29. Offset pawl 105 activated by rod 36 and synchronized with the movement of pushers 22 ordinarily allows ratchet 104 to rotate the distance of one tooth which by means of gears 32 and 34 permit collecting pocket 25 to drop a distance slightly greater than the height of four shingles. When pawl 105 reaches that portion of ratchet 104 with teeth missing a correspondingly greater rotation takes place causing the collecting pocket 25 to drop away from receiving position and the succeeding pocket 25 to come into position for receiving shingles. As is evident, ratchets may be provided for each type of shingle, number of lanes and number required per bundle. The teeth in each ratchet are spaced to provide the correct average number of shingles per bundle per revolution of the ratchet.

In Fig. 15 may be seen an example of ratchet 104 with teeth arranged in three groups, each group separated by missing teeth as indicated by cross hatching. The second ratchet (Fig. 2) has a full complement of teeth. The weight of shingles 28 in collecting pockets 25 mounted on endless chains 24 (Fig. 2) tends to rotate sprockets 23 meshed with endless chains 24 in a counter-clockwise direction. Sprockets 23 geared to ratchet 104 are dependent on the latter for their freedom to rotate. The rotation of ratchet 104 in turn is regulated by pawl 105. At the start of operation collecting pockets conveyor 3 is adjusted to dispose an empty collecting pocket 25 in receiving position with escape mechanism 31 coordinated so that pawl 105 engages the first tooth of one of the groups of teeth on ratchet 104. A bundle of shingles placed by hand on the collecting pocket just below the pocket in receiving position provides the necessary weight for initially inducing movement of the pockets. A group of shingles, for example four shingles, from cross-collecting table 2 is then deposited on the empty collecting pocket 25 in receiving position. Rod 36 motivated by pushers 22 actuates pawl 105 allowing ratchet 104 to rotate the distance of one tooth thus permitting the collecting pocket to drop a distance of about the height of four shingles. A second group of four shingles is then deposited on the first group of shingles following which pawl 105 releases ratchet 104 to permit it to rotate the distance of another tooth. This operation is repeated until all the teeth in the group of teeth of ratchet 104 has been passed by pawl 105 whereupon the ratchet rotates a distance corresponding to the number of missing teeth and thereafter pawl 105 engages the first tooth of the following group of teeth. The movement of collecting pockets 25 due to missing teeth between groups of teeth on ratchet 104 is sufficient to drop collecting pocket 25 out of receiving position and advance the succeeding pocket into receiving position. The number of teeth in each group may be identical in which case each bundle of shingles would be the same. Variations in the relative number of teeth in each group would give corresponding relative differences in the number of shingles in each bundle. For example, assume three bundles totalling 80 shingles are desired and that the cross-collecting table is designed to deliver groups of four shingles each to the collecting pockets conveyor. The ratchet employed should then have three groups of teeth, two groups having the same number of teeth and one group smaller by one tooth. As the ratchet passes over the larger group of teeth there will be delivered to the collecting pocket from the cross-collecting table seven small stacks of four shingles each for the first bundle, i. e. 28 shingles; after which the loaded collecting pocket will drop down out of receiving position and a succeeding collecting pocket will move into receiving position due to missing teeth at the end of the group of teeth. In like manner 28 shingles will be delivered as a bundle for the second large group of teeth and 24 shingles for the smaller group of teeth. Thus in each cycle there will be delivered 80 shingles composed of three bundles with the respective bundles containing 28, 28 and 24 shingles.

Figures 16, 18:
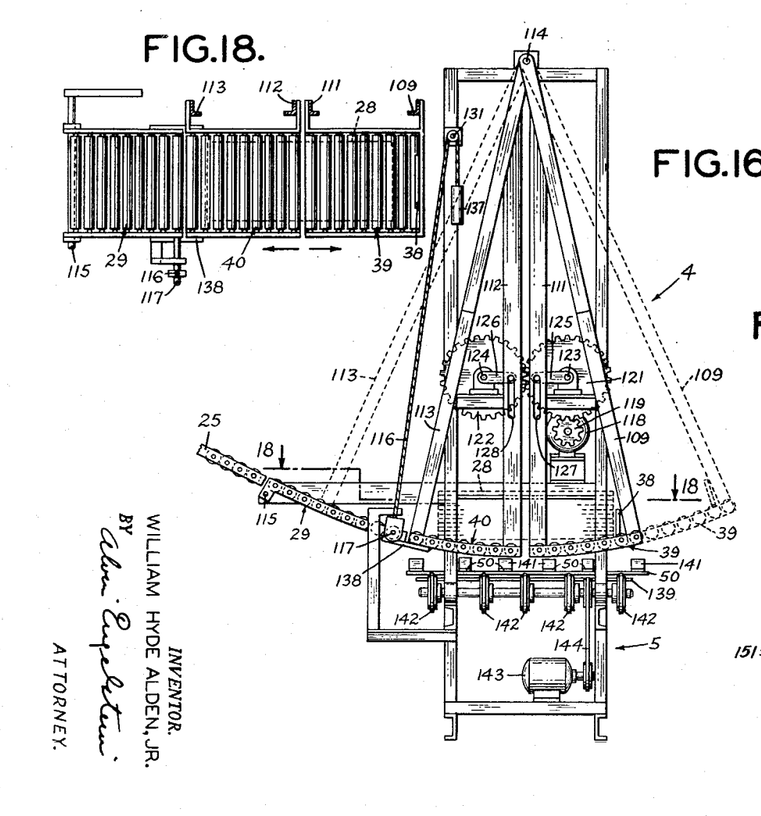
Fig. 16 is a side elevation of the roller conveyor clamshell type taken in the direction of the arrows on line 16—16 of Fig. 2.
Fig. 18 is a plan view of the platform of the roller conveyor clamshell type taken on line 18—18 of Fig. 16.

Roller conveyor clamshell type 4, Fig. 16, has a curved substantially horizontal platform divided into sections 39, 40 and 29 of which 39 and 40 are supported by beams 109, 111, 112 and 113 suspended from shaft 114. Section 29 is hinged at one end by rod 115 and attached to the other end is cable 116 affixed to extension 117 rigidly attached to section 29. A bundle of shingles 28 discharged from collecting pockets conveyor 3 rolls down onto pivoted platform 29 thence onto the platform of clamshell conveyor 4 to the end of the platform where it is stopped by stop plate 38. Contact of the bundle 28 with stop 38 at the far end of the platform moves a switch, not shown in the drawing, suitably disposed on stop 38 which starts motor 118. The motor drives gear 119 connected to gear 121 which in turn is meshed with gear 122 causing gears 121 and 122 keyed to shafts 123 and 124 to rotate in opposite directions. Mounted on shafts 123 and 124 are also arms 125 and 126, respectively. The ends of lever arms 125 and 126 move downwardly in slots 127 and 128 thereby causing beams 111 and 112 to diverge thus causing sections 39 and 40 to divide and move apart in an arc, their open position being shown by the dotted lines. Cable 116 extends along idler pulley 131 and has affixed to its other end a counterweight 137 which causes hinged section 29 to be elevated for the purpose of removing it from the path of section 40 when it extends outwardly. The weight of a bundle of shingles deposited on platform 29 drops it into alignment with section 40 thereby permitting the bundle of shingles to continue its passage onto sections 39 and 40. Rest 138 prevents platform 29 from falling below the level of section 40. If desired power driven means not shown in the drawing may be employed to elevate hinged section 29 simultaneously with the division of sections 40 and 39.

Beneath sections 39 and 40 are a series of parallel bars 50 pivotally mounted on support 139 and counter-balanced by weights 141 so that normally bars 50 are elevated at an angle above the horizontal. A wrap-around wrapper is placed on the bars 50 either manually or automatically. The weight of shingle bundle 28 dropping through the aperture formed by the division of sections 39 and 40 onto the wraparound wrapper overbalances weight 141 thus lowering the wrap-around wrapper and bundle 28 thereon until they are engaged by revolving conveyor wheels 142 disposed beneath and between bars 50. Wheels 142 are driven by motor 143 and belt 144. As the bundle 28 moves off conveyor 5 onto conventional conveyor 60 out of the path of clamshell conveyor 4 it strikes a release not shown in the drawing which causes the sections of the platform of clamshell 4 to return by gravity to their normal closed position or alternatively, bundle 28 on conveyor 60 may strike a micro-switch 150 thereon which actuates reversing motor 118 connected thereto by wires 151 for positively closing sections 39 and 40.

Figure 17:
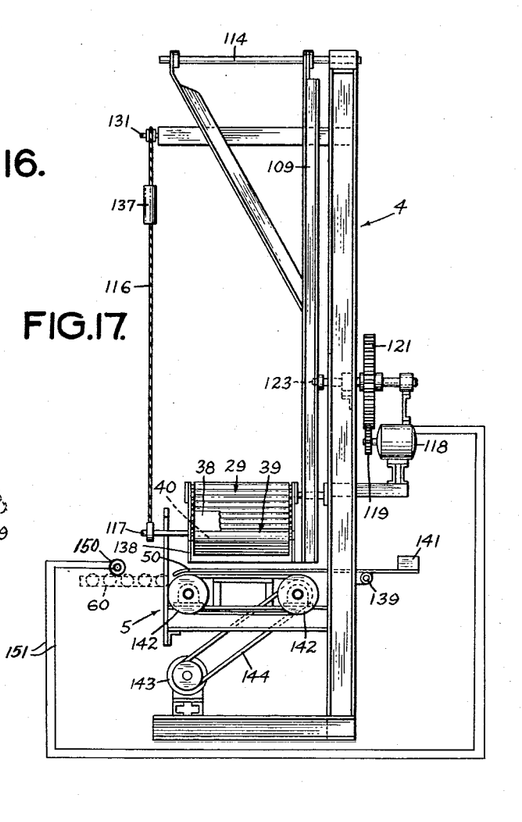
Fig. 17 is a front elevation of the roller conveyor clamshell type.

Fig. 17 is a side view of clamshell conveyor 4 and particularly shows the motor 118 driving gears 119 and 121 which causes arms 125 and 126 to rotate thereby dividing sections 39 and 40. A bundle of shingles 28 shown resting on platform 39 drops onto actuated tying conveyor 5 immediately disposed beneath sections 39 and 40.

A plan view of the sectional platform of clamshell 4 is illustrated in Fig. 18. Section 29 hinged at one end with rod 115 and supported at the other end by extension 117 and cable 116 is disposed adjacent section 40 supported by beams 113 and 112. The other dividing section 39 is supported by beams 111 and 109. At the far end of section 39 is stop plate 38. Shown in dotted lines on sections 39 and 40 is a bundle of shingles 28.

Although in the foregoing description the apparatus and process has been illustrated with reference to shingles it will be obvious that other relatively flat articles could be handled in a similar manner.

While I have illustrated the major items of equipment in my apparatus operating in combination with one another it will be apparent that they may be utilized individually or in conjunction with other devices. For instance, the clamshell conveyor may be employed to drop stacks of articles on a conveyor with any suitable feeding means for delivering the stacks to the clamshell conveyor. Likewise, the cross-collecting table and collecting pockets conveyor may be adapted to operate with devices other than those illustrated.

Although preferred embodiments of the invention have been disclosed for purposes of illustration, it will be evident that various changes and modifications may be made therein without departing from the scope and spirit of the invention.

I claim:

1. A device adapted to deposit a stack of articles onto a conveyor comprising in combination a platform composed of one sloping section hinged at one end, a curved second section adjacent the unhinged end, and a curved third section adjacent said second section, said three sections forming a substantially continuous surface, means for elevating the unhinged end of said first section out of the path of said second section, supports for suspending said second and third sections, and means including said supports for diverging said second and third sections thereby forming an aperture between them through which a stack of articles may drop.

2. A device adapted to deposit a stack of articles onto a conveyor comprising in combination a platform composed of one sloping section hinged at one end, a curved second section adjacent the unhinged end, and a curved third section adjacent said second section, said three sections forming a substantially continuous surface, means for pivotally moving said first section out of the path of said second section, supports for suspending said second and third sections, and means including said supports for diverging said second and third sections thereby forming an aperture between them through which a stack of articles may drop.

3. Apparatus adapted to deposit a stack of articles onto a conveyor comprising in combination means for passing a stack of articles onto a platform, said platform comprising one sloping section hinged at one end, a curved second section adjacent the unhinged end, and a curved third section adjacent said second section, said three sections forming a substantially continuous surface, supports for suspending said second and third sections, a switch adapted to be operated by articles on said platform, means including said supports under the control of said switch for diverging said second and third sections thereby forming an aperture between them through which the stack of articles may drop, and a conveyor beneath said platform adapted to receive said articles dropping through the aperture.

4. Apparatus adapted to deposit a stack of articles onto a conveyor comprising a combination means for passing a stack of articles onto a platform, said platform comprising one sloping section hinged at one end, a curved second section adjacent the unhinged end, and a curved third section adjacent said second section, said three sections forming a substantially continuous surface, a counterweight for pivotally elevating said first section out of the path of said second section, supports for suspending said second and third sections, a switch adapted to be operated by articles on said platform, means including said supports under control of said switch for diverging said second section and said third section thereby forming an aperture between them through which the stack of articles may drop, and a conveyor beneath said platform adapted to receive said stack of articles dropping through the aperture, a second switch adapted to be operated by said articles on said conveyor, and means including said supports under control of said second switch for returning the second and third sections of platform to their normal closed position.

5. A device adapted to deposit a stack of articles onto a conveyor comprising in combination a platform composed of one sloping section hinged at one end, a curved second section adjacent the unhinged end, and a curved third section adjacent the second section, said three sections forming a substantially continuous surface, upright beams attached to and suspending said second and third sections, said beams being pivotally mounted at their upper ends, a slot in one of said beams supporting the second section, a slot in one of said beams supporting the third section, a pair of lever arms engaged in said slots, power means adapted to move the lever arms engaged in said slots thereby causing the slotted beams to diverge and carry with them the second and third sections to form an aperture between said sections, a cable affixed to the unhinged end of the first section, and a counterweight attached to said cable adapted to move the first section out of the path of the diverging second section.

6. A device adapted to deposit a stack of articles onto a conveyor comprising in combination a platform composed of one sloping section hinged at one end, a curved second section adjacent the unhinged end, and a curved third section adjacent the second section, said three sections forming a substantially continuous surface, upright beams attached to and suspending said second and third sections, said beams being pivotally mounted at their upper ends, a slot in one of said beams supporting the second section, a slot in one of said beams supporting the third section, a pair of lever arms engaged in said slots, a gear arrangement with which said levers are connected adapted to move the lever arms in said slots thereby causing the slotted beams to diverge and carry with them the second and third sections to form an aperture between said sections, a cable affixed to the unhinged end of the first section, power means for driving the gear mechanism and lever arms, means for pulling the cable thereby moving the first section out of the path of the diverging second section, a switch adapted to be operated by articles on said platform, and means under the control of said switch for starting said power means.

WILLIAM HYDE ALDEN, Jr.

REFERENCES CITED

The following references are of record in the file of this patent:

UNITED STATES PATENTS

| Number | Name | Date |
| --- | --- | --- |
| 991,148 | Goldman | May 2, 1911 |
| 1,840,370 | Ryan et al. | Jan. 12, 1932 |